Oct. 11, 1955
J. MÜHLBEYER
2,720,300
CENTRIFUGAL COUPLING DEVICES
Filed Jan. 6, 1953
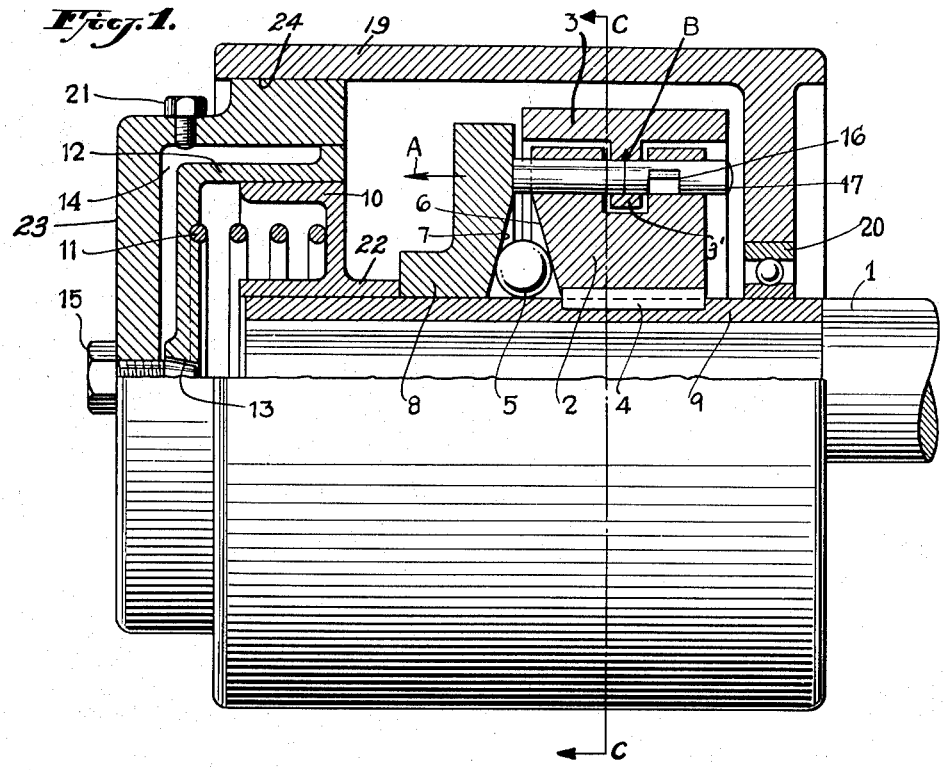
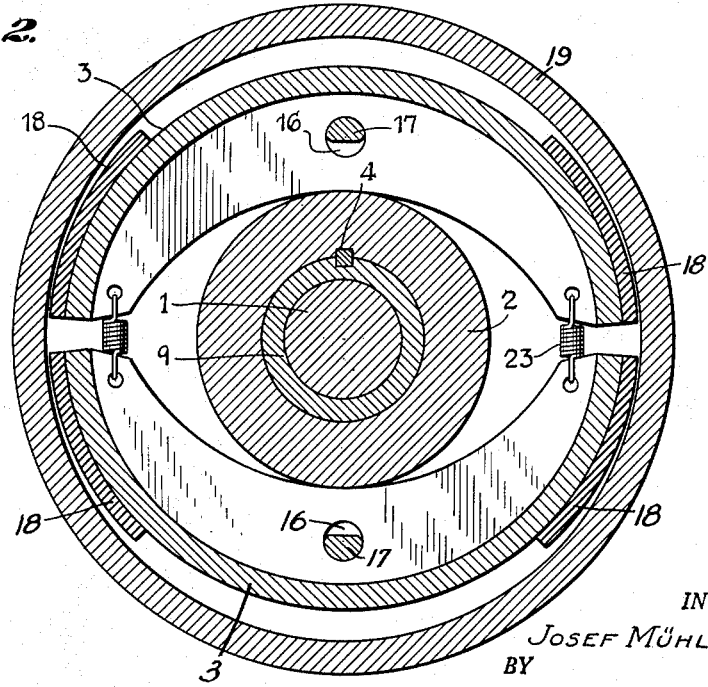
INVENTOR.
JOSEF MÜHLBEYER
BY
ATTORNEY.

United States Patent Office 2,720,300
Patented Oct. 11, 1955

2,720,300

CENTRIFUGAL COUPLING DEVICES

Josef Mühlbeyer, Frankfurt am Main-Rodelheim, Germany, assignor to Merz-Werke-Gebrueder Merz, Frankfurt am Main-Rodelheim, Germany, a firm of Germany Application January 6, 1953, Serial No. 329,846

Claims priority, application Germany October 21, 1952

9 Claims. (Cl. 192—105)

My invention relates to belt sheaves, clutches, friction couplings and other power transmission devices in which a mechanical coupling between a driving member and a driven member is effected by centrifugal force. More particularly, my invention relates to centrifugal coupling devices in which the force-transmitting coupling effect commences after the elapse of a selectively adjusted time delay.

Among the known devices of this kind are the so-called magnet couplings or clutches in which the force-transmitting connection between the driving member and driven member is due to magnetic forces produced by an electromagnet. The coupling operation can be initiated at any chosen moment, by correspondingly applying the excitation of the electromagnet.

Also known are couplings with an elastically deformable body between the driving and driven members. The body is inflated by air or liquid to provide by elastic deformation the force-transmitting connection. Such couplings also permit selecting the starting moment at will, since that moment is determined by the instant when the intermediate coupling is caused to become inflated.

The known devices have the common disadvantage of requiring additional auxiliaries such as extraneous power sources. Thus, the magnetic couplings must be provided with an electric current supply including the necessary control means, while the couplings with inflatable bodies require auxiliary apparatus for supplying pneumatic or hydraulic pressure. The known devices, therefore, are dependent for operation upon certain prerequisites that cannot always be met, thus imposing a limitation on the applicability of these devices. Besides, the known devices of this kind leave much to be desired as regards simplicity of construction.

It is an object of my invention to devise time-controllable centrifugal couplings that avoid such deficiencies.

To this end, and in accordance with a feature of my invention, I place a centrifugally effective intermediate coupling member into locking engagement with a displaceable release member so that the centrifugal force to which the intermediate member is subjected can become effective to establish the coupling connection only after an additional displacing movement is imparted to the release member.

According to another feature of my invention, I provide the device with additional centrifugal means so connected with the displaceable release member that the releasing displacement is also caused by centrifugal force occurring within the coupling device itself. As a result, the operation of the coupling device is fully controlled by centrifugal forces thus making the operation independent of extraneous auxiliaries while nevertheless affording a selective setting of the release moment.

According to still another feature of the invention, I provide the coupling device with control means for varying the velocity of the releasing displacement thus permitting a selective choice of the time point at which the coupling is to become effective.

According to more specific features of the invention, the release member for interlocking the centrifugally effective intermediate coupling member is preferably displaceable in a direction parallel to the axis of revolution, and this axial displacing movement is subjected to time-delay means. The time delay means consist preferably of a liquid-filled dash-pot device which includes a damper piston with a return spring and a regulatable escape valve. The centrifugal forces, produced when the driving member of the coupling device starts running, act upon a pressure-transmitting body which then moves axially with a displacement velocity controlled by the above-mentioned damper piston. When this pressure transmitting body and the damper piston have reached a given end position, a locking pin carried by the pressure body releases the intermediate coupling member which then produces the force-transmitting connection between the driving member and the driven member.

In such a coupling, the intermediate coupling member remains in its condition of rest up to the moment of its release. This represents another advantage of the invention because it minimizes the interval of time during which slipping friction may occur between the two parts to be coupled, thus also reducing the mechanical wear of these parts. Since the other structural components of the coupling device perform only slight and preferably linear movements, they also have a long time of useful life due to the relatively slight mechanical stresses. The adjustable escape valve of the dash-pot device offers the possibility of setting the releasing moment at will. When the flow cross section of the valve is large, the liquid escapes rapidly so that the axial releasing movement is also rapid and the coupling responds after a relatively short interval of time. When the flow cross section of the valve is set to a smaller magnitude, the oil escapes more slowly, for instance, so that the releasing displacement can only assume a creeping speed, thus requiring a longer interval of time until the intermediate coupling member is released for coupling operation.

The foregoing and other objects, advantages and features of my invention will be apparent from, or will be referred to, in the following description in conjunction with the drawings, on which:

Fig. 1 shows a coupling device according to the invention suitable for operation as a belt sheave, the upper portion of the illustration showing an axial section, and the lower portion a lateral view; and Fig. 2 shows a cross section of the same coupling device, the section being taken along the line C—C in Fig. 1.

The coupling device illustrated in Figs. 1 and 2 is mounted on one end of a driving shaft 1. Firmly secured to the shaft is a driving member 2 which serves as a support and guide for an intermediate coupling member 3. The driving member 2 is joined with shaft 1 by a key 4 so as to have a fixed position in axial as well as angular respects relative to the shaft. The intermediate member 3 has a flange-shaped extension 3' guided in a corresponding groove along the periphery of the driving member 2 so that member 3, when subjected to centrifugal force, is movable relative to member 2 in the radial direction to come into frictional coupling engagement with the inner peripheral surface of a driven coupling member 19 designed as a belt sheave.

A number of steel balls 5 are located at the inner periphery when the shaft 1 is at rest. During revolution of the shaft, the balls 5 are subjected to centrifugal force and move radially toward the periphery while passing along a slanted front face 6 of the driving member 2 and also along a likewise slanted front face 7 of a pressure transmitting body 8. The body 8 is axially displaceable on a bushing 9 and abuts against a damper piston 10 having a central sleeve portion 22 rotatably and slidably supported on the bushing 9. The piston 10 forms a variable volume-chamber together with a cylinder 12. Piston 10 is abutted by a return spring 11 disposed within the chamber and about the axis of shaft 1. The cylinder 12 is fixed with respect to a coaxial bearing member 23 having a cylindrical surface 24 tightly fitted into the inner cylindrical surface of the outer end of the driven coupling member 19. An annular space 14 is formed between the piston 12 and the bearing member 23. When shaft 1 is revolving and the coupling device is not clutched in so that member 19 is at rest, the parts 23, 12 and 10 are also at rest; but when the device is clutched in as described below, the cylinder 12 and the piston 10 revolve together with the driven member 19.

When the steel balls 5, under the effect of centrifugal force, move toward the periphery they force the pressure body 8 axially away from the member 2 as is indicated by an arrow A. As a result, the piston 10 is forced into the cylinder in opposition to spring 11. A corresponding amount of oil is displaced from the cylinder chamber through the opening of an adjustable escape valve 13 and enters into the annular reservoir space 14.

In the illustrated embodiment the escape valve 13 comprises a screw 15 whose inner end forms a valve cone entering into a correspondingly conical opening in the wall of cylinder 12. Depending upon whether the conical gap between the two conical faces is enlarged or reduced by a tighter or looser setting of screw 15, the flow of oil displaced by the damper piston escapes faster or more slowly into the annular space 14. The escape velocity determines the velocity with which the pressure-transmitting body 8 is axially displaced by the centrifugal force acting upon the balls 5. When the damper piston 10 and the body 8 reach a given end position, the part 3' of the intermediate coupling member 3 registers with a recess 16 of locking pins 17 mounted on the pressure body 8. Thus released, the intermediate coupling member 3, under the effect of centrifugal force, moves radially toward the periphery as is indicated by the arrow B. A friction lining 18 mounted on the peripheral surface of intermediate member 3 then engages the inner surface of the driven coupling member 19, thus establishing the force-transmitting connection between the driving member and the driven member.

Up to the release moment, the driven member 19 remains at rest because it is mounted on shaft 1 by a free-running ball bearing 20 which prevents the driven member from being entrained unless the coupling engagement with the intermediate member 3 is established. Up to the moment of release the intermediate member 3, although subjected to centrifugal force, is locked in the retracted position as illustrated, so that the slip between driving and driven parts is at a minimum. Any loss of oil from the dash-pot portion of the coupling device can be replenished after loosening a screw 21.

As explained, the coupling device has the particular advantage that the commencing moment of the coupling effect can be adapted within wide limits to each particular application simply by correspondingly turning the valve screw 15, without requiring a disassembly or opening of the coupling device.

Aside from the possibility of selectively setting the releasing moment of the coupling, the coupling device according to the invention, as exemplified by the above-described embodiment, has the additional advantage in conjunction with machine drives, that such drives can be given a smaller power rating than otherwise required. This advantage is due to the fact that the machinery to be driven is started only after the drive has accelerated up to the proper speed. If, for instance, the drive is an electric motor, particularly a multi-phase motor with a squirrel-cage armature, then the use of a coupling according to the invention also results in a considerable reduction in starting current. This current reduction is achieved by virtue of the fact that the coupling device may perform the entire starting process in three stages. At first, and as customary, the motor to be started is energized in star connection which has the known effect of reducing the starting current. Thereafter the motor is switched to delta connection. The current peak apt to occur at that moment is only slight if the motor is still running idle. Therefore, the coupling device is so adjusted that at the moment of star-to-delta switching, the force-transmitting connection between the driving member and the driven member of the coupling is not yet established. Only after the switching is completed is the force-transmitting connection established. From then on the electric motor, already running at the rated speed, accelerates the masses of the machinery to be driven from standstill. However, the kinetic energy of the motor running at full speed then provides a favorable starting torque so that in this moment no dangerous current peaks can occur. In this respect, a coupling according to the invention is superior to those of the previously known couplings which become effective at the moment of star-to-delta switching. Since this switching is accompanied by a short lasting drop in motor speed and since, with these known couplings, an additional mass must be accelerated at the same moment, they cannot avoid peak currents as effectively as couplings according to the invention.

Due to the fact that with a coupling device according to the invention the entire starting procedure is distributed over three intervals of time, only the no-load current peaks peculiar to the particular motor being used may occur even under the most unfavorable condition. Therefore, it generally suffices to equip the motor with a manually operated star-delta switch. It is not necessary to use for starting those types of automatically operating switches that effect the transfer from star to delta automatically after the elapse of a switching pause. However, if desired, switches of the latter type may also be used in conjunction with a coupling according to the invention, just as it is possible, for further current reduction during starting, to connect reactor coils in series with the motor. In other words, the various electrical possibilities aiming at a reduction of the motor starting currents remain fully utilizable also in conjunction with a coupling device according to the invention.

Coupling devices according to the invention are also advantageously applicable with motors that are started by switching them directly onto the energizing line.

It will be obvious to those skilled in the art upon a study of this disclosure that my invention permits of various modifications and applications other than those specifically mentioned in the foregoing, without departing from the essence of the invention and within the scope of the claims annexed hereto.

I claim:

1. A centrifugally controlled coupling of selectively time-delayed action, comprising a revolvable driving member, a revolvable driven member, an intermediate coupling member revolvable together with said driving member and radially movable due to centrifugal force into coupling engagement with said driven member, a release member slidably movable on said driving member in a direction parallel to the axis of revolution, said release member being in locking engagement with said intermediate member to hold it disengaged from said driven member when said driving member is at rest, a centrifugally movable control mass revolvable together with said driving member and operatively connected with said release member for moving said release member out of said locking engagement, and adjustable time-delay means coupled with said mass for controlling the speed of movement of said release member.

2. A centrifugally controlled coupling of selectively time-delayed action, comprising a revolvable driving member, a revolvable driven member, an intermediate coupling member revolvable together with said driving member and centrifugally movable relative to said driving member into coupling engagement with said driven member, a release member displaceable relative to said driven member and in locking engagement with said intermediate member to hold it disengaged from said driven member when said driving member is at rest, centrifugal force means revolvable together with said driving member and operatively connected with said release member for moving it out of said locking engagement, and an adjustable dash-pot device having a liquid-filled variable-volume container connected with said release member and a return spring tending to hold said container expanded and to hold said release member in said locking engagement, said container having an adjustable orifice for setting a desired time delay of coupling action.

3. A centrifugally controlled coupling of selectively time-delayed action, comprising a revolvable driving member, a revolvable driven member forming a housing coaxial with said driving member and enclosing said driving member, an intermediate member mounted on said driving member within said housing and being centrifugally movable relative to said driving member into coupling engagement with said driven member, a release member axially movable on said driving member and in locking engagement with said intermediate member to hold it disengaged from said driven member when said driving member is at rest, a pressure body axially displaceable within said housing and joined with said release member, a dash-pot device adjoining said body and having a return spring acting against said body to bias said release member into said locking engagement, and centrifugal weight means disposed between said body and said driving member for forcing them axially apart in opposition to said dash-pot device to release said intermediate member due to centrifugal force of said weight means.

4. In a centrifugal coupling according to claim 3, said body having a slanted axial surface portion and forming together with said driving member a cavity converging toward the periphery, and said weight means consisting of balls disposed in said cavity to act upon said surface portion.

5. In a centrifugal coupling according to claim 3, said dash-pot device comprising a piston adjoining said body and axially displaceable together therewith, a cylinder structure forming a variable-volume chamber together with said piston and forming another chamber together with said housing, said cylinder structure having valve means through which said two chambers communicate with each other, liquid disposed in said chambers, and control means forming part of said valve means and being disposed on said housing and accessible from the outside of said housing.

6. In a centrifugal coupling according to claim 3, said release member comprising a pin mounted on said pressure body and extending parallel to the axis of revolution so as to move a given distance when said pressure body is moving from its position of rest to its end position, and said pin being in said locking engagement with said intermediate member over the major portion of said distance so as to release said intermediate member only when said body reaches said end position.

7. In a centrifugal coupling according to claim 3, said release member comprising a pin mounted on said pressure body and extending parallel to the axis of revolution so as to move a given distance when said pressure body is moving from its position of rest to its end position, said intermediate member having a part provided with an opening traversed by said pin, and said pin having an axially limited recess located in said opening only when said body reaches said end position, whereby said intermediate member is released only after said body has moved said distance.

8. In a delayed action belt pulley coupling the combination comprising, a shaft, a driving member revolvable with said shaft, a revolvable driven member surrounding said driving member and coaxial with said shaft, means operative under the influence of centrifugal force to move said driving member radially to effect clutching interengagement between said driving and driven members, means to render said moving means inoperative, a dash-pot mechanism, and means controlled by said dash-pot mechanism and by the speed of rotation of said shaft for rendering said moving means operative.

9. In a delayed action belt pulley coupling the combination comprising, a shaft, a driving member revolvable with said shaft, a revolvable driven member surrounding said driving member and coaxial with said shaft, means operative under the influence of centrifugal force to move said driving member radially to effect clutching interengagement between said driving and driven members, means comprising a movable pin coaxially disposed with respect to said shaft to render said moving means inoperative, a dash-pot mechanism, and fly-weight means controlled by said dash-pot mechanism and by the speed of rotation of said shaft for moving said pin so as to render said moving means operative.

References Cited in the file of this patent

UNITED STATES PATENTS

| 1,338,891 | Woodhouse | May 4, 1920 |
| 1,659,286 | Wallace | Feb. 14, 1928 |
| 1,689,913 | Carrey | Oct. 30, 1928 |

FOREIGN PATENTS

| 23,249 | Great Britain | Oct. 11, 1912 |
| 313,038 | Great Britain | Oct. 24, 1929 |
| 683,130 | Great Britain | Nov. 26, 1952 |